March 8, 1932.  H. A. VALLEZ  1,848,445
FILTER
Filed March 5, 1928   3 Sheets-Sheet 1
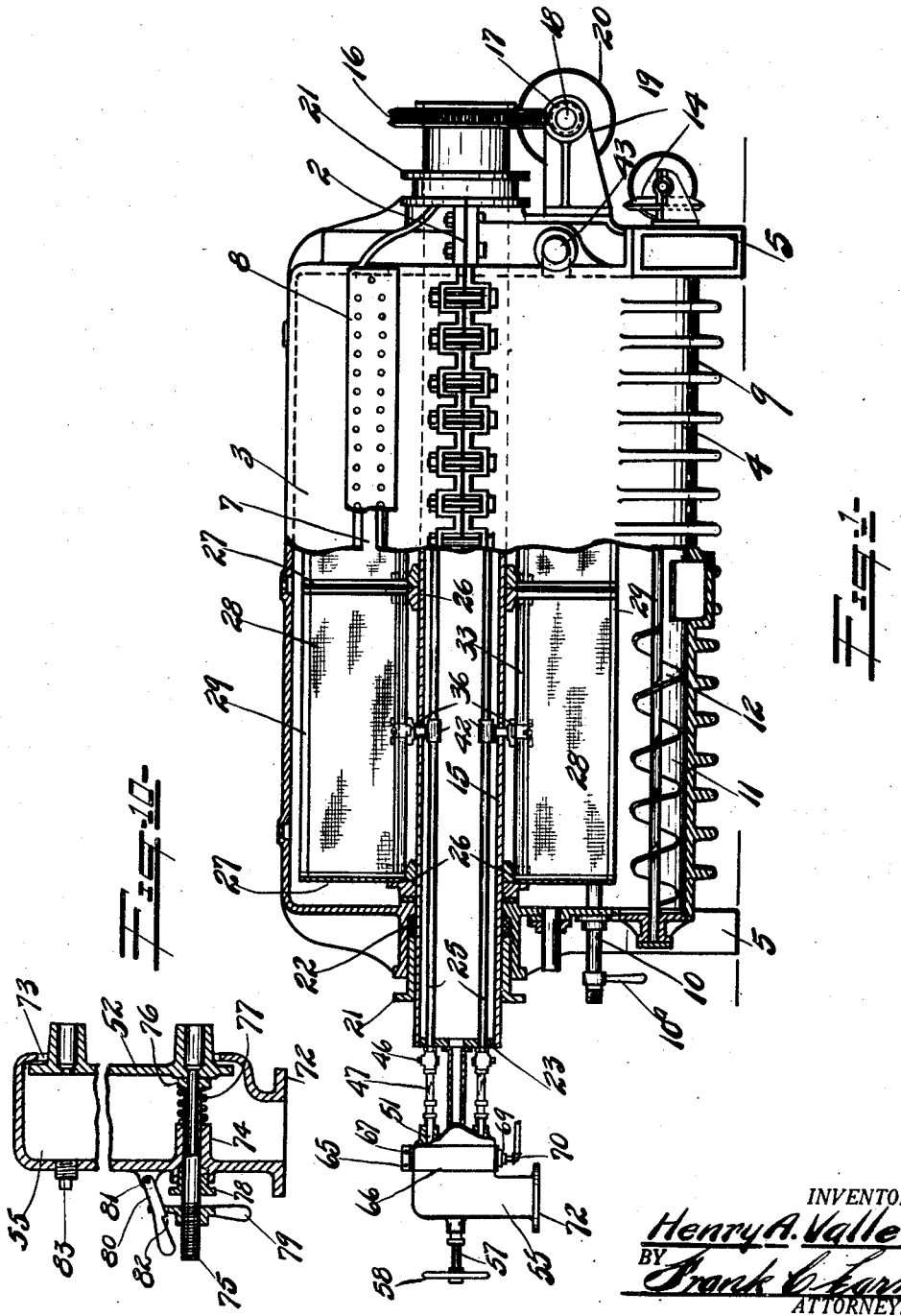
INVENTOR.
Henry A. Vallez.
BY Frank C. Farman
ATTORNEYS.

March 8, 1932. H. A. VALLEZ 1,848,445
FILTER
Filed March 5, 1928 3 Sheets-Sheet 2
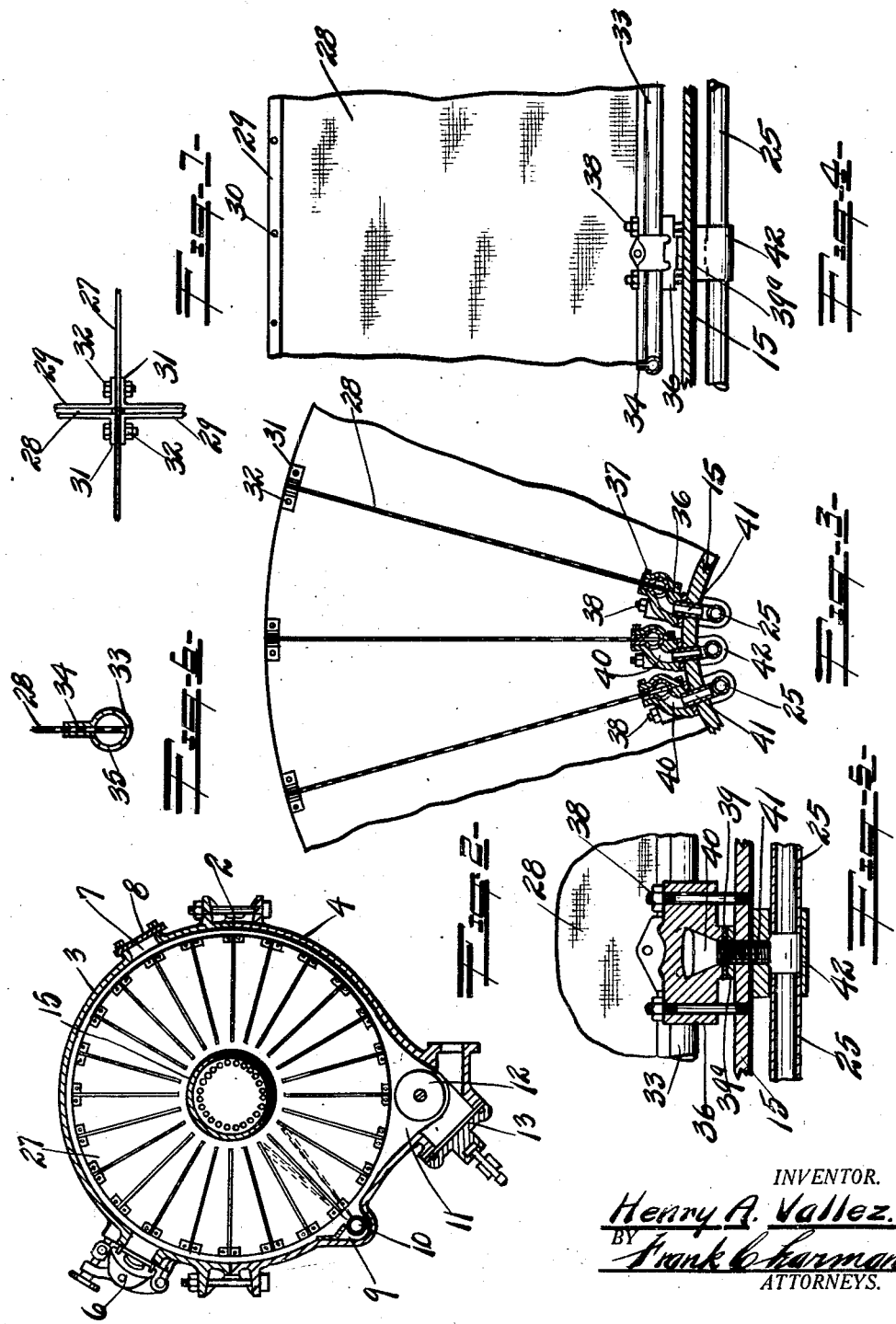
INVENTOR.
Henry A. Vallez.
BY
Frank C. Harman
ATTORNEYS.

March 8, 1932.   H. A. VALLEZ   1,848,445
FILTER
Filed March 5, 1928   3 Sheets-Sheet 3

INVENTOR.
Henry A. Vallez.
BY Frank C. Chapman.
ATTORNEYS.

Patented Mar. 8, 1932

1,848,445

UNITED STATES PATENT OFFICE

HENRY A. VALLEZ, OF BAY CITY, MICHIGAN, ASSIGNOR TO VALLEZ ROTARY FILTERS OF BAY CITY, MICHIGAN, A CORPORATION OF MICHIGAN

FILTER

Application filed March 5, 1928. Serial No. 259,105.

My invention relates to filters, and more especially to a filter of the rotating type.

The prime object of the invention is to design a filter with a hollow shaft, and having a plurality of radially arranged leaves radiating from the said shaft, and which can be quickly removed or replaced after the shell is assembled and without removal or displacement of any of the remaining leaves.

Another object is to design a rotating pressure filter having an individual discharge pipe for each pair of leaves, and an individual sight glass in each pipe, so that the clarity of the filtrate is clearly visible to the eye, and the presence of a leaky leaf can be readily detected and located.

A further object is to provide means for shutting off any one or more of the filter leaves without disturbing the operation of the remainder of the filter.

The above and other objects will appear as the specification progresses, reference being had in the accompanying drawings in which I have shown the preferred embodiment of my invention, and in which like reference numerals indicate like parts throughout the several views thereof.

In the drawings,

Fig. 1 is a part sectional side view of my improved filter.

Fig. 2. is a part sectional end view thereof showing the arrangement of the leaves the connections being omitted.

Fig. 3. is an enlarged fragmentary sectional end view showing the manner of securing the leaves in position, and also the connection to the individual discharge pipes.

Fig. 4. is a side view thereof.

Fig. 5. is an enlarged fragmentary sectional side view, showing the discharge connection from the leaf to the discharge pipe.

Fig. 6. is an enlarged fragmentary sectional edge view of the lower end of the leaf.

Fig. 7. is a fragmentary plan view showing the fastening of the leaves to the supporting plates.

Fig. 10 is a fragmentary sectional view showing an alternate construction of the filtrate receiving member and air connection.

Figure 8:
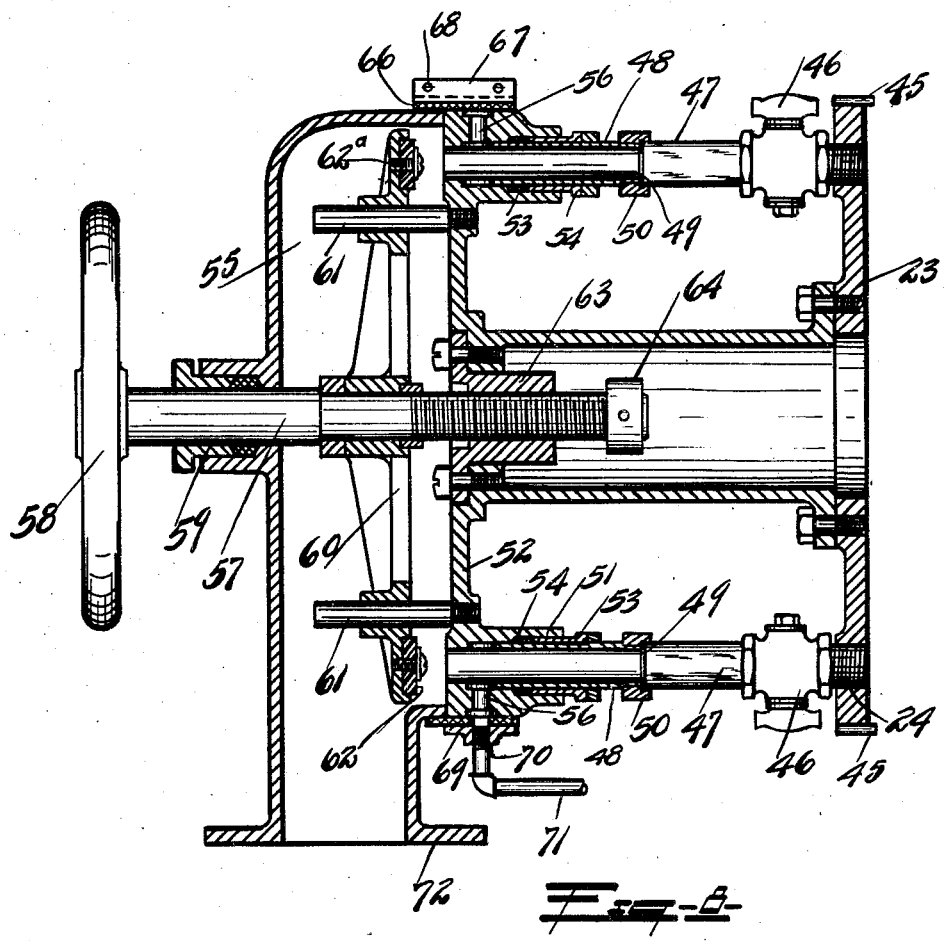
Fig. 8 is an enlarged sectional side view of the sight arrangement.
Figure 9:
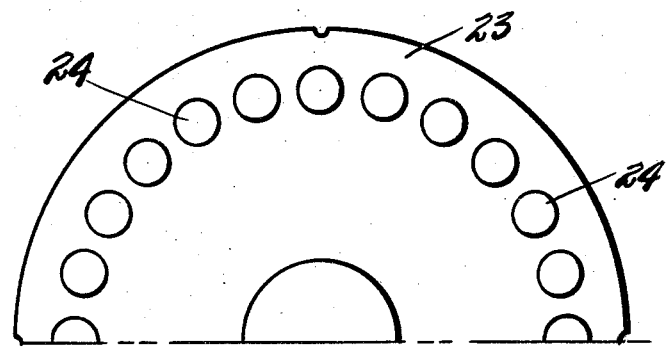
Fig. 9 is a fragmentary end view thereof.

Heretofore it has been necessary when desiring to remove one of the leaves in a rotating pressure filter of the type shown, to lift off the upper half of the shell and remove the shaft with the leaves mounted thereon, and then remove the leaves one by one. As these filters operate under pressure, the shell is of necessity quite heavy, and numerous bolts are necessary to keep the filter tight, further, each individual filtering element is covered with a suitable cloth, which must be renewed from time to time, consequently, it will be clearly obvious that considerable time and labor is necessary to remove one or more of the filtering elements from the filter, and I have therefore designed a new filtering element and arrangement, whereby any one of the filtering elements can be removed or replaced, without opening the shell, or disturbing any of the other elements, which has a maximum filtering area, and which is very easily and quickly secured in position and from the outside of the shell.

Referring now particularly to the drawings in which I have shown the preferred embodiment of my invention, the numeral 1 indicates the cast cylindrical shell, divided on the horizontal center line 2 into two halves 3 and 4 and supported on legs 5 in the usual manner, an inspection door 6 is provided on one side of the upper half of the shell, and a similar slotted opening 7 extends across the length of the shell on the opposite side and is adapted to be covered by a plate 8, held in place by means of bolts or the like.

The lower half of the shell is suitably shaped as shown at 9 to accommodate a spray pipe 10 which is connected to a suitable source of liquid supply and which is used for removing the cake formed on the individual leaves during the filtering process, said pipe being provided with small openings (not shown) through which the water is directed and is rotated by means of a handle 10ª to control the direction of the spray.

The bottom of the lower half of the filter is shaped similar to, and forms a trough 11, and a right and left hand screw conveyer 12 is journaled therein, so that the cake removed from the leaves, will be conveyed to the center of the trough, where it is discharged through a door 13, which is controlled in any approved manner, the end 14 of the conveyer shaft projecting beyond the shell and is driven in any approved manner.

A centrally disposed hollow pipe or shaft 15 is journaled in the shell, and a worm gear 16 is mounted on the one end, meshing with and being driven by a worm 17 mounted on a shaft 18, which is journaled in a worm case 19 mounted on the frame, a drive pulley 20 being mounted on the worm shaft and is driven from any suitable source of power, glands 21 being provided on the shaft as shown, and suitable packing 22 insures a tight leak-proof joint.

A supporting member 23 forms a closure for the discharge end of the pipe and is secured therein in any approved manner, said member being provided with a plurality of openings 24 in which the filtrate discharge pipes 25 are mounted.

Split hubs 26 are mounted on the shaft in spaced apart relation, and filter frame supports 27 are mounted thereon and secured thereto, each filter element comprising a preferably corrugated plate 28, covered by means of a suitable cloth, the edges of the plate being bound with a strip of metal 29 secured in position by bolts 30, the ends 31 of the strip on the top of the leaf, projecting beyond the element, and being bent at right angles, and are then bolted to the support by bolts 32.

A pipe 33 is secured to the lower end of each leaf, and is provided with a slotted opening 34 into which the plate extends, being welded or soldered in position. A discharge opening 35 is provided in each pipe, and a split fitting 36 is clamped thereover, bolts 37 clamping the fitting on the pipe, while vertically disposed bolts 38 clamp the fitting to the drive shaft. A centrally disposed passage 40 registers with the opening 35, and a threaded pipe nipple 41 is mounted in the drive shaft, and communicates with the passage 40, the lower end being threaded into a fitting 42, in which the pipes 25 are mounted, the upper end being provided with a lock nut 39ª for drawing it tightly against the drive shaft, and a gasket 39 is interposed between the fitting and lock nut, the inner end of pipes 25 being plugged in the usual manner. Inlet openings 43 are provided in the lower half of the shell and control the admission of liquid thereto.

The sight arrangement comprises the supporting member 23 secured to the pipe 15 by means of pins 45, a service cock 46 being mounted on the end of each discharge pipe, and a sight glass 47 is connected thereto, the opposite end opening into a sleeve 48, and a gasket 49 being interposed therebetween and a collar 50 is shrunk on the sleeve 48, this sleeve projects into the cored passages 51 provided in the member 52 and a gland and packing 53 and 54 respectively form a leak proof joint, this passage 51 opens into a filtrate receiving member 55, secured to the member 52 in any approved manner, vertically disposed passages 56 opening into the passage 51 for a purpose to be presently described.

A shaft 57 is mounted in the filtrate receiving member as shown, a hand wheel 58 being mounted on one end, and a gland 59 is provided in the usual manner, a spider 60 being rotatably mounted in this shaft, and is drilled to receive the spaced apart guide pins 61 which are mounted in the face of the member 52, the face of the spider being grooved as shown, and a rubber gasket 62 is pressed in said groove, or screws 62ª can be used if desired, the inner end of the shaft 57 being threaded and engages a threaded fitting 63 which is bolted to the member 52, a collar 64 serving to limit outward movement of the shaft.

An adjustable take-up is secured to the sight arrangement as shown, and comprises a flexible belt or band 66, which covers the passages 56, spaced apart angles 67 being secured to the ends of the belt, and bolt 68 provide an adjustment. A flange 69 is secured to the belt at the bottom, and a pipe 70 is threaded thereinto, and communicates with the openings 56 as the sight mechanism rotates, so that an air line 71 may be connected thereto, and air forced into each individual filter leaf for assisting in the removal of the cake.

A flange 72 is provided on the bottom of the filtrate receiving member and connects to a pipe line or other suitable receptacle (not shown). It will therefore be clear that all, or any one or more individual leaves may be cut off without disturbing or interfering with the operation of the filter.

In operation the liquid to be filtered is admitted through the inlet openings 43, the filtering element slowly revolving, pressure forcing the liquid through the leaves and depositing the suspended matter in a cake thereon, when the cake is built to a certain thickness the filter is drained, the spray pipe is then used to clean the leaves, and air can be used as above described.

In Fig. 10 of the drawings I have shown an alternate construction for the filtrate receiving member, the flexible belt is omitted, and the member 52 is received within the opening 73 of the filtrate receiving member, a boss 74 being cast integral with said member, and a pipe 75 projects therethrough and is slidably mounted therein, the end of the pipe having an enlarged shoulder 76, and a spring 77 is interposed between the end of the boss and said shoulder, and tends to force the end of the pipe against the face of the member 52, a gland 78 is provided on the pipe 75 in the usual manner and a forked handle 79 is threaded on said pipe, a latch 80 being pivotally secured to the filtrate receiving member at 81, and is shouldered as shown at 82 to engage the handle and hold the pipe out of engagement with the member 52 when the filter is in operation.

A plug 83 is also provided as shown, and when removed permits the insertion of a brush for cleaning the sight glasses as desired.

When desiring to remove one of the leaves, the side plate 8 is removed. A long handled wrench is then used to remove the bolts, and the filter leaf can then be withdrawn through the opening.

From the foregoing description it will be obvious that I have perfected a very simple filter leaf and arrangement, whereby one or more leaves can be removed or replaced without opening the shell or disturbing the others, and whereby the clarity of the filtrate from each pair of leaves is clearly visible and whereby any one or all of the leaves can be cut off without disturbing the operation of the filter.

What I claim is:—

1. In a pressure filter, a casing, a hollow shaft, individual discharge pipes mounted therein, filter leaves mounted on the shaft and communicating with the pipes, means for simultaneously closing all of said pipes or any one selective pipe, and means for introducing air into said pipes when the discharge end is closed.

2. In a pressure filter, a casing, filter leaves mounted therein, discharge pipes communicating with said leaves, means for simultaneously closing all of said pipes, and means for selectively introducing air to each individual discharge pipe when the discharge end is closed.

In testimony whereof I hereunto affix my signature.

HENRY A. VALLEZ.